G. W. KILLIN.
HOSE COUPLING FOR FIRE HYDRANTS.
APPLICATION FILED SEPT. 16, 1915.
1,166,223.
Patented Dec. 28, 1915.
2 SHEETS—SHEET 1.
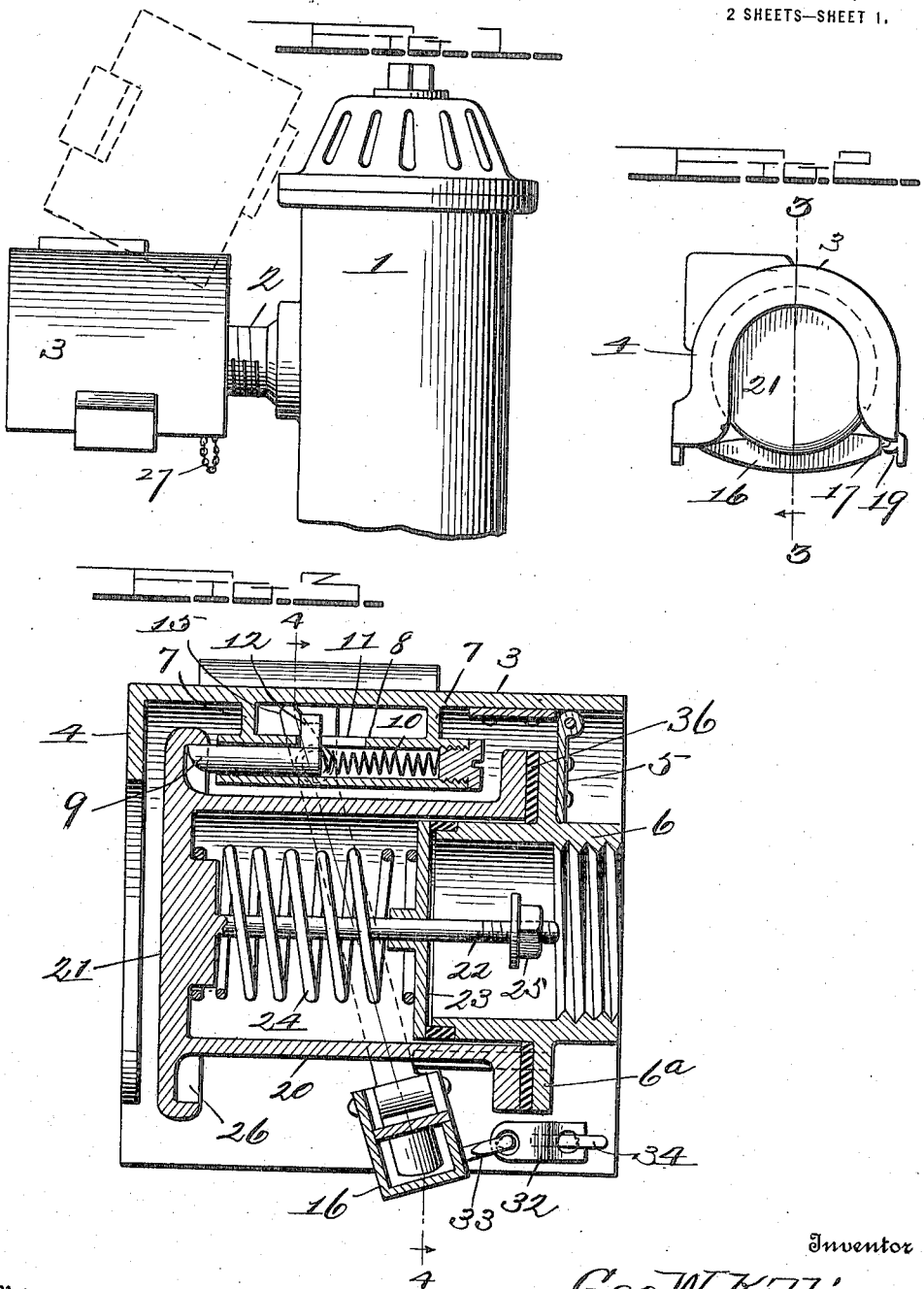
Witness
Chas. L. Griesbauer.
Inventor
Geo. W. Killin
By E. B. McBath
Attorney G. W. KILLIN.
HOSE COUPLING FOR FIRE HYDRANTS.
APPLICATION FILED SEPT. 16, 1915.
1,166,223.
Patented Dec. 28, 1915.
2 SHEETS—SHEET 2.
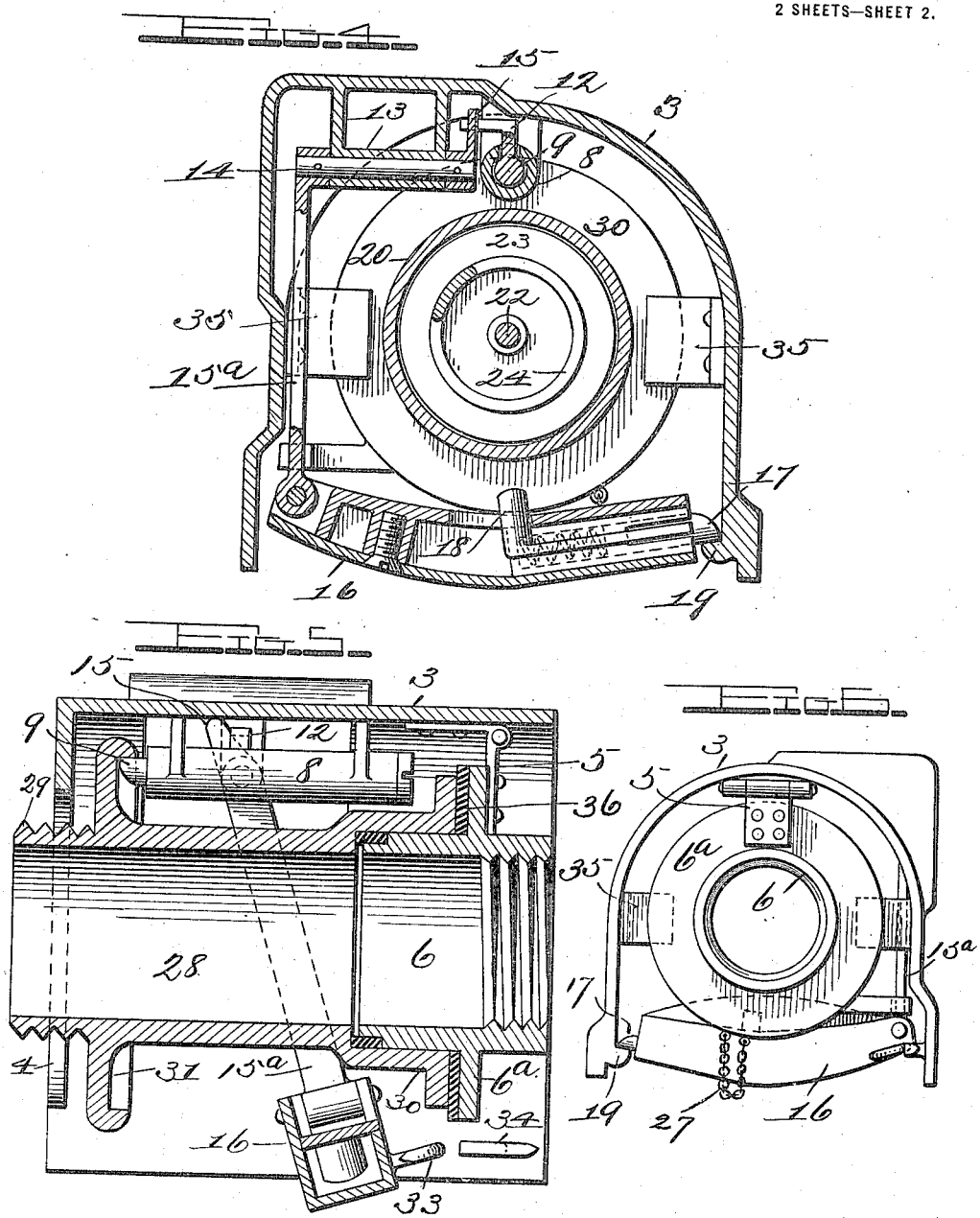
Witness
Chas. L. Gricstauer.
Inventor
Geo. W. Killin
By C. B. McBath
Attorney

UNITED STATES PATENT OFFICE.

GEORGE W. KILLIN, OF HUNTINGTON, WEST VIRGINIA.

HOSE-COUPLING FOR FIRE-HYDRANTS.

1,166,223.　　　　　Specification of Letters Patent.　　Patented Dec. 28, 1915.

Application filed September 16, 1915.　Serial No. 51,003.

*To all whom it may concern:*

Be it known that I, GEORGE W. KILLIN, a citizen of the United States, residing at Huntington, in the county of Cabell and State of West Virginia, have invented certain new and useful Improvements in Hose-Couplings for Fire-Hydrants, of which the following is a specification.

This invention relates to a coupling device designed for the quick connecting of a hose section to a fire hydrant, although it may also be used for connecting hose sections for other purposes than the above mentioned if desired. But it is especially adapted for the use of fire departments as the coupling can be done almost instantly, and without requiring the firemen to screw or unscrew any part, or requiring any rotation of any part of the coupling member. The device also includes means for normally closing the hydrant opening when the hose section is not coupled thereto, together with means for automatically throwing said closure device out of the way when a coupling member is to be inserted in position.

The invention consists in the novel features of construction hereinafter described, pointed out in the claims and shown in the accompanying drawings, in which:

Figure 1 is a side elevation showing the device attached to a hydrant, the cover being indicated lifted in dotted lines. Fig. 2 is a front end view of the device, with closure cap in position. Fig. 3 is an enlarged section on the line 3—3 of Fig. 2. Fig. 4 is a section on the line 4—4 of Fig. 3. Fig. 5 is a vertical longitudinal section the hose coupling member being in position. Fig. 6 is a rear view.

In these drawings 1 represents a hydrant having a side discharge pipe 2, which is suitably threaded, and these parts are designed to represent any standard fire plug or hydrant now in use.

My invention comprises a curved shield 3 which forms a housing opening downwardly and at the front end said housing is provided with a flange 4 and within the rear end is a hinged plate 5 having a flanged interiorly threaded pipe section 6 secured thereto. It will be understood that said pipe section 6 is threaded upon the discharge pipe 2 of the hydrant and remains there permanently, the hinge connection permitting the shield to be lifted and swung upwardly as indicated in dotted lines in Fig. 1.

In the top of the casing are transverse ribs 7, and a sleeve 8 is carried between said ribs, said sleeve carrying a locking bolt 9 normally pressed outwardly by a spring 10. The sleeve is slotted as shown at 11 and a lug carried by the bolt as indicated at 12 extends outwardly through and works in said slot. A second sleeve 13 is provided at right angles to the sleeve 8 and carries a shaft 14 upon one end of which is pinned an arm 15 which is adapted to engage the lug 12 and force the bolt 9 inwardly. To the other end of the shaft 13 is keyed a lever 15$^a$ and said lever carries at its lower end a hinged lock casing 16. Within this casing works a spring pressed bolt 17 having at its inner end a laterally projecting thumb piece 18, the casing being suitably slotted for said thumb piece, and the bolt 17 is adapted to engage a suitable keeper 19. When the bolt 19 is in engagement with its keeper the shaft 14 occupies such position that the bolt 9 is in locking position, as shown in Figs. 3 and 5. In order to swing the lever 15 a sufficient distance to rotate the shaft 14 so that the arm 15 will retract the bolt 9 it is necessary that the bolt 19 be disengaged thereby releasing the casing 16.

The parts above described are those which form parts of the shield or cover 3.

In order to close the front end of the pipe section 5 when the hydrant is not in use I employ a cap in the form of a cylinder 20 flanged at each end and having its front end closed by a head 21. This head carries a rod 22 and working on said rod and in the cylinder is a loose disk 23. Between the cylinder head 21 and the disk 23 is a coil spring 24 and a nut 25 is placed upon the outer end of the rod 22. The front flange of this cap is undercut or provided with an annular recess as shown at 26 which is normally engaged by the bolt 9. When in position the spring pressed head 23 engages the front end of the pipe 6 as shown at Fig. 3 and the cap is held in place by the bolt 9 and the lock casing 16, and by reason of the flange 4 said cap can be inserted or removed only through the lower opening of the shield 3. To prevent loss of the cap while the hydrant is being used it is preferably connected to some suitable part of the device, preferably the flange 6$^a$ of the pipe 6, by a chain 27.

The coupling member of the hose section consists of a cylinder 28 suitably corrugated at one end as shown at 29 and upon which end the hose, not shown, is secured, and enlarged and flanged at the opposite end as indicated at 30 to fit over the forward portion of the pipe 6 and engage the flange 6ᵃ. The coupling member is also provided with a recessed flange 31 which is similar to the flange 26 of the cap.

While it might appear from the above description that the device was somewhat complicated it is in reality very simple and its operation is almost automatic. With the parts in the position shown in Fig. 3, and a small seal 32 connecting a hook 33 of the casing 16 to a hook 34 carried by the shield 3 to connect the hose it is simply necessary for the firemen to press back the thumb piece 18 and a pull on the lock casing 16 breaks the seal and at the same time retracts the bolt 9, thereby releasing the cap cylinder 20 and when so released the spring 24 acting against the head 23 will throw the cap off of the pipe section 6. The coupling member 28 is then slipped over the pipe section 6, the shield 3 dropped in place, and the lock casing 16 pushed back into position. The coupling member 28 is then locked in place exactly in the same manner as the cap had been. A fireman can unlock the device with one hand while holding the coupling member 28 in the other hand, and as the cap is practically discharged as soon as the casing 16 is pulled open, the fireman can then lift the shield with the same hand, slide the coupling 28 into position, let the shield drop, and throw the lock casing 16 back into place as the shield or cover fall back. A person who is familiar with the operation and use of this device can couple a hose section to it in less than three seconds. Forward movement of the closure cap or of the coupling member 28 is prevented by the inwardly extending side lugs 35 as shown in Figs. 4 and 6. It will be understood that when the shield is placed in position the pipe 6 becomes practically a part of the discharge pipe of the hydrant, and where a specially constructed hydrant might be employed the said pipe 6 and the pipe 2 might be formed in one piece, but this would not be practical where the device was to be applied as at present intended to hydrants already in use. Suitable washers 36 are employed to prevent leaking.

What I claim is:

1. In a device of the kind described, the combination with a discharge pipe, of a curved shield hingedly connected to said pipe, means carried by said shield for locking a coupling member to said pipe, and a closure cap normally retained within said shield and closing said discharge pipe.

2. The combination with a discharge pipe of a hydrant, a downwardly and forwardly open shield hinged to said pipe, a coupling member adapted to engage said pipe and means carried by said shield for locking said coupling member in position.

3. The combination with a discharge pipe, of a shield means for hingedly connecting said shield to said pipe, a coupling member adapted to rest within said shield and engage said pipe and means carried by the shield for locking said member in said shield and in engagement with said pipe.

4. The combination with a discharge pipe, of a vertically swinging shield having a front and side opening, a coupling member adapted to be inclosed by said shield when in engagement with said pipe, and means carried by said shield for locking said coupling member against withdrawal from the shield.

5. A device of the kind described comprising a discharge pipe, a vertically movable shield coöperating therewith, a coupling member adapted for engagement with the discharge pipe, the shield being adapted to swing over and inclose the greater portion of said coupling member, means carried by said shield for locking said member to the shield, and a closure cap adapted to fit upon the discharge pipe when the coupling member is removed, the said locking devices also locking the closure cap in position.

6. The combination with a discharge pipe, of a semi-cylindrical shield, a pipe section hinged within said shield and adapted to be threaded upon the discharge pipe and to form a continuation thereof a coupling member adapted to be brought into engagement with said pipe section when the shield is swung out of the way and to be inclosed by said sleeve when the shield is returned to normal position, and means for locking the coupling member to said shield.

7. In a device of the kind described, the combination with a discharge pipe, a pipe section adapted to be permanently threaded thereon and to become a part of said discharge pipe, a shield hinged thereto and opening on one side and at the ends, a lock casing hinged to one side of the shield, a lock carried by said casing and engaging in the opposite side of the shield, a spring pressed bolt carried within the shield, an operating lever carried by said shield and to which the lock casing is hinged, and the coupling member adapted to be inclosed by said shield and to be locked therein by the lock casing and by said bolt, the swinging of the lock casing into releasing position retracting said bolt.

8. The combination with a discharge pipe section, a shield hinged thereto, said shield having a side and front opening, a hinged casing adapted to extend across the side opening, means carried by said casing for locking it to the shield, a coupling member adapted to be brought into engagement with the pipe section, and to be partially inclosed by said shield, said coupling member having a recessed flange, a spring pressed bolt carried within the shield and adapted to engage said recess, a bolt operating lever connecting with said casing, said bolt and casing serving to retain the coupling member in position within said shield as and for the purpose set forth.

9. The combination with a discharge pipe section, a hinged shield, a closure cap, comprising a spring pressed head adapted to engage said discharge pipe means for locking said cap within the shield, said cap being automatically ejected when released, and a coupling member adapted to replace said closure cap and to be locked within said shield by the locking means above mentioned.

In testimony whereof I have affixed my signature in the presence of two witnesses.

GEORGE W. KILLIN.

Witnesses:
 FRED F. BILLMAN,
 LUCIAN F. WETHERALL.

Copies of this patent may be obtained for five cents each, by addressing the "Commissioner of Patents, Washington, D. C."